United States Patent
Patterson

(10) Patent No.: US 8,034,150 B2
(45) Date of Patent: Oct. 11, 2011

(54) PROCESS AND SYSTEM FOR MATERIAL RECLAMATION AND RECYCLING

(75) Inventor: John A. Patterson, Cartersville, GA (US)

(73) Assignee: Metal Conversion Technologies, LLC, Cartersville, GA (US)

( * ) Notice: Subject to any disclaimer, the term of this patent is extended or adjusted under 35 U.S.C. 154(b) by 0 days.

(21) Appl. No.: 12/249,213

(22) Filed: Oct. 10, 2008

(65) Prior Publication Data

US 2009/0095127 A1     Apr. 16, 2009

Related U.S. Application Data

(60) Provisional application No. 60/979,611, filed on Oct. 12, 2007.

(51) Int. Cl.
*C22B 23/00* (2006.01)
*C22B 17/00* (2006.01)
*C22B 7/00* (2006.01)
*C22B 9/02* (2006.01)

(52) U.S. Cl. ............. 75/10.14; 75/10.18; 75/10.59

(58) Field of Classification Search ............ 75/10.14, 75/10.18, 10.67, 628, 668, 669
See application file for complete search history.

(56) References Cited

U.S. PATENT DOCUMENTS

| | | | | |
|---|---|---|---|---|
| 3,438,495 A | * | 4/1969 | Turnock | 209/219 |
| 4,675,048 A | * | 6/1987 | Maillet | 75/10.14 |
| 4,750,993 A | * | 6/1988 | Donhauser et al. | 209/11 |
| 5,735,933 A | * | 4/1998 | Yokoyama et al. | 75/403 |
| 6,831,939 B2 | | 12/2004 | Bratina et al. | |
| 2002/0124691 A1 | * | 9/2002 | Tateiwa et al. | 75/714 |
| 2005/0247162 A1 | * | 11/2005 | Bratina | 75/10.14 |

FOREIGN PATENT DOCUMENTS

| | | | |
|---|---|---|---|
| JP | 01228586 A | * | 9/1989 |
| JP | 07003344 A | * | 1/1995 |

OTHER PUBLICATIONS

Derwent Acc No. 1971-59081S for DE 158387 4B, application date Aug. 11, 1967. abstract.*
Dewent Acc No. 2001-105658 for JP 2000282067 A, publication date Oct. 10, 2000. abstract.*
Machine translation of JP 2000-282067, pubished Oct. 10, 2000.*
Machine translation of JP 07003344, published Jan. 6, 1995.*
Translation of DE 1583874 by Kupferhutte, D. published Sep. 10, 1970.*
Machine translation of JP 003344 A, Delisle et al. published Jan. 6, 1995.*

* cited by examiner

*Primary Examiner* — George Wyszomierski
*Assistant Examiner* — Tima M McGuthry Banks
(74) *Attorney, Agent, or Firm* — Gardner Groff Greenwald & Villanueva, PC

(57) ABSTRACT

A system and process for reclaiming nickel and cadmium from a feed source such as Ni—Cd batteries. The feed source is shredded to produce feed particles, screened to size the particles, magnetically separated to remove non-metallic materials, and induction heated to generate nickel and cadmium products.

16 Claims, 2 Drawing Sheets

PROCESS AND SYSTEM FOR MATERIAL RECLAMATION AND RECYCLING

CROSS REFERENCE TO RELATED APPLICATION

This application claims priority benefit to U.S. Provisional Patent Application Ser. No. 60/979,611, filed Oct. 12, 2007, the content of which application is incorporated by reference herein in its entirety.

TECHNICAL FIELD

The present invention relates generally to the fields of reclaiming, recycling and/or producing metallic materials.

BACKGROUND OF THE INVENTION

For a variety of reasons, it has been found desirable to reclaim or recycle metallic-containing products and feedstock to produce metals, and to separate out various metallic and non-metallic constituents from such materials.

SUMMARY OF THE INVENTION

The present invention provides a system and process for reclaiming, recycling and producing metallic materials. In example forms of the invention, nickel alloy and/or cadmium metal are produced from feedstock including nickel-cadmium batteries.

In one aspect, the present invention is a process for reclaiming nickel and cadmium from a feed source, the process including shredding the feed source to produce feed particles, screening the particles, removing or separating ferrous from non-ferrous and metallic from non-metallic materials from the feed particles, and induction heating the feed particles to generate nickel and cadmium products.

In another aspect, the invention is a system for reclaiming nickel and cadmium from a feed source, the system including a shredder for transforming the feed source to particles, a screen separator for sizing the particles, a magnetic separator for removing or separating ferrous from non-ferrous and metallic from non-metallic materials from the feed particles, an induction furnace for receiving and heating the feed particles to generate nickel and cadmium products, a mold station for casting the nickel product, and means for collecting the cadmium product.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
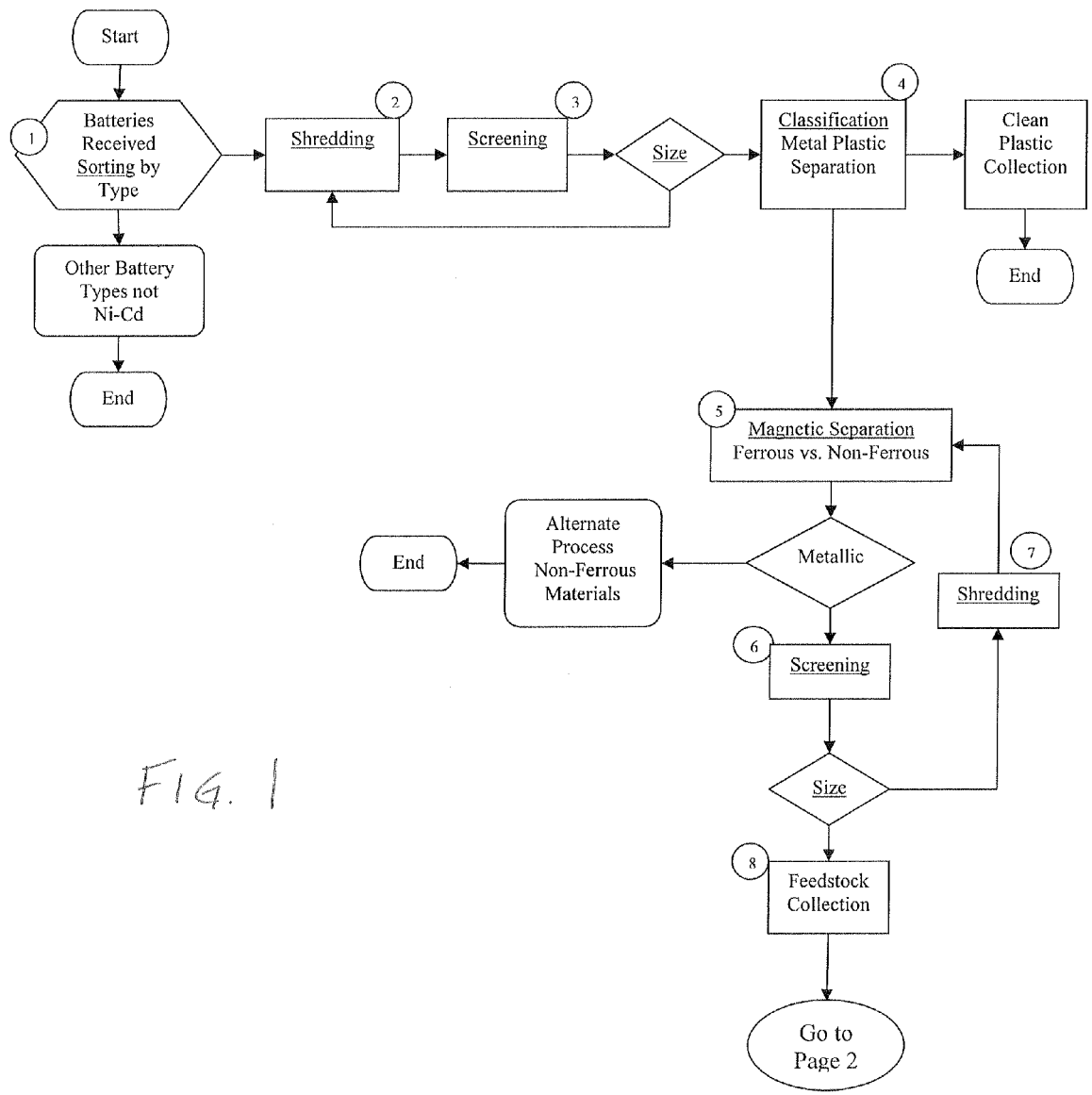
FIG. 1 is a diagram schematically showing a first portion of a system and process according to an example embodiment of the present invention.
Figure 2:
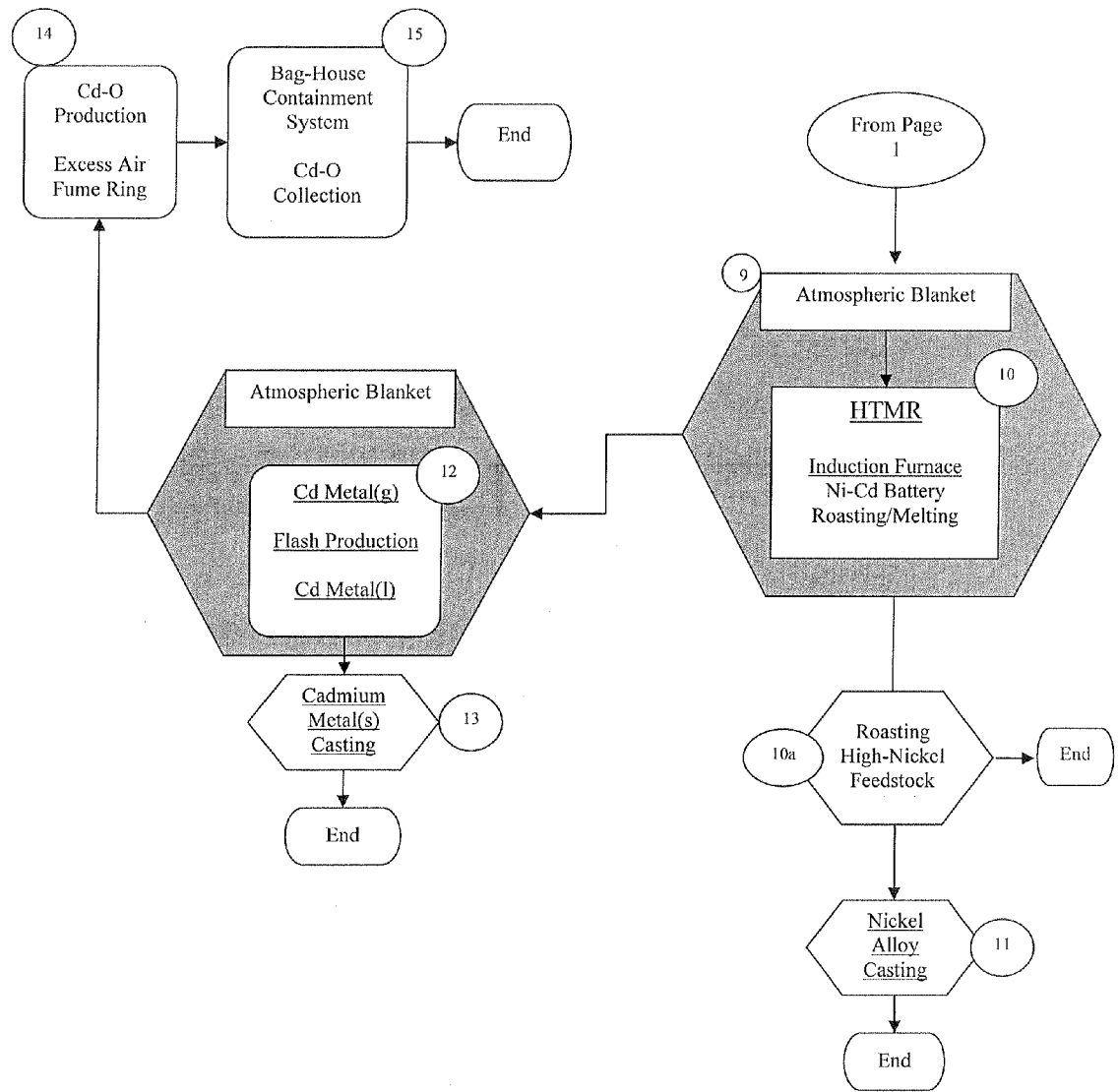
FIG. 2 is a diagram schematically showing a second portion of the system and process of FIG. 1.

An example embodiment of the system and process of the present invention is shown schematically in FIGS. 1 and 2. In Step 1, incoming feedstock such as spent or discarded batteries are segregated by type, configuration, and chemistry. Sorting can be carried out manually or in an automated process. Feedstock components not comprising the desired input materials are removed during the screening process. For example, if the desired feedstock is nickel-cadmium (Ni—Cd) batteries, other battery types and non-battery materials are removed. Rejected materials may be disposed of, transferred to other processing lines, or sold to other processors. In alternate embodiments, the sorting is carried out externally, prior to receiving the incoming feedstock. Although the sorting step may be omitted, its provision advantageously eliminates tramp-metal contamination and the production of waste components that may be considered hazardous. Hazardous waste may be produced when the final product is devalued due to tramp-metal contamination and when the reclamation cost to perform additional refining exceeds its current market-value.

In Step 2, the accepted portion of the sorted feedstock is shredded. The Shredding Process is used to reduce the material component size, which initiates the separation of metal from its nonmetal components, while producing a properly-sized feedstock particle for induction. The shredding can be carried out, for example, by a four (4) shaft shearing system that incorporates two (2) of the shafts counter-rotating, which provides an anti-jamming action. The shafts are preferably at least 5.25 inches in diameter with a six (6) hook knife (1.5"× 8" dia.) spaced about 0.75 inches apart. The heavy shaft spec is desirable in order to transfer the torque generated by the 75 HP motor.

Feedstock sizing and induction melting directly depend on each other in order to achieve the desired and optimum results. For example, to achieve optimum heat transfer through the particle (uniform and thorough induction), the particle size typically should not vary by more than one standard deviation of the optimum size. More specifically, larger particles often have a higher density verses smaller particles, causing variations in the heat transfer rate throughout the entire heat (melt) which may reduce the vaporization and production of molten-metal which in turn increase the consumption of energy and cost.

In Step 3, a screening step assures that all material reaches proper size. Battery parts that exceed proper particle size are routed back via a recycle-loop for further shredding. Screening can carried out in terms of geometry, size or weight. In example forms of the invention, a particle size in the range of about ¾ inches and down is generated. The screening can be automated or manually carried out. In example systems according to the invention, a rotating grizzly screen is used.

Step 4, the classification process, provides separation of certain component materials from the process stream. In example forms, the classification step incorporates the use of mechanical vibration, which lifts and stirs the material, inducing separation through density differences between particles in the process stream. The greater the density differences from particle to particle, the greater the separation efficiency. A clean plastic feedstock is produced during this stage, which may be further processed or sold as a product. Material classification equipment comprises, in example form, an electrically powered flat-deck vibrating table. The drive system preferably generates an oscillating motion at about 35 Hz and about 0.375 inch amplitude, with translation (dynamic motion) occurring simultaneously in both the horizontal and vertical axes. In order to achieve the desired oscillation motion, the eccentric weights of the drive system are adjusted (modified) to rotate in the identical direction.

Magnetic Separation (Step 5) provides separation between metal and non-metals and between ferrous and nonferrous metals. Metal and non-metal separation removes plastic and other combustible materials from the feedstock stream. Ferrous and non-ferrous separation allows for the removal of hidden tramp-metal and tramp-metal components; i.e., copper, tin, lead, antimony, as well as solder, wire, clips and fasteners. In example form, the magnetic separation equipment comprises a Ceramic Rare-Earth Permanent Magnet. The magnet is preferably housed in a stainless-steel drum (barrel) which allows the ferrous and non-ferrous materials to flow over the magnet's surface. Special consideration is given to the rotational speed of the barrel. A 1750 rpm drive system with a 40:1 reducer allows for a 0.75 inch film of material to flow over the magnetic surface of the barrel and to separate cleanly, (approximately 6,000 lbs of separation per hour).] Like-density Separation also occurs during this step, between items constructed of high-impact plastic and metallic battery component parts. Both are similar in density, but magnetic separation makes the distinction and separation possible. In addition, magnetic separation increases the efficiency of plastic recycling by removing metallic universal-waste battery parts, which act as contaminants, from the plastic battery parts. Also, tramp-metal separation occurs eliminating the threat of contamination in roasted batteries, metal-alloy and cadmium-metal production. The by-product stream(s) of the magnetic separation step may include plastic and/or metallic materials.

A secondary screening step (Step 6) is optionally provided to further control particle size. A recycle loop returns oversized particles for additional shredding and magnetic separation. A second shredding step (Step 7) provides the final size reduction required in order to control particle size prior to roasting/melting. Following this step, the material returns to step 5, magnetic separation, and then step 6, screening for size.

Once the feed-stream is at the appropriate particle size, it enters one or more feedstock collection bins (Step 8) for storage prior to further procession. Alternatively, other forms of batch or continuous processing are utilized. The feed-stock collection bins are preferably pre-measured volumetric containers that assure optimum charge density of the furnace's crucible. Optimum charge density assures efficiency via electrical usage, atmospheric blanketing use, oxidation and baghouse efficiency. The volumetric measurement is a function of the furnace's crucible volume less the atmospheric blanket thickness (designed at 20% of the crucible volume) or V=0.80 (pi)(radius squared)(height).

Pelletized Graphite (⅜"×⅛, S-0.02%, Fixed Carbon—97%) is added to the feed stream (shredded/sized battery parts), delivered and charged into an induction furnace (Step 10). Once the furnace-lid is secured to the fume-ring, an atmospheric blanket (Step 9) comprised of a nitrogen-argon mixture, is applied to the furnace's crucible, resting directly above the charge. Due to the greater density of the atmospheric blanket oxygen is displaced from the crucible preventing molten metal and metal vapor from bonding with oxygen (oxidation)—no metal oxides are formed. Chopped-Flake Graphite (¼"×0") injection (9a) is specific to this overall process in order to protect the molten metal and metal vapor from oxide formation. It is mixed into the molten metal reducing pre-existing metal-oxides by forming carbon monoxide gas (CO) and as a secondary reaction, stripping oxygen away from the metal gas ($CdO_{(g)}$) forming $CO_2$ and $Cd_{(g)}$.

An induction furnace is the preferred heat source, as its power-source is "metal specific", or "frequency-specific", in its design. The power source and the induction-coil are preferably tuned specifically to meet the demands of the melt itself. No two furnaces will melt the same way unless specifically designed to do so. The induction coil preferably has twelve turns per foot per the upper active and twelve turns per foot per the lower active coil (frequency at 600 Hz.). During the melt process, the feedstock passes through the atmospheric blanket, it reacts with graphite while it melts producing a molten metal bath and cadmium(g). The induction furnace may be controlled in order to roast the shredded/sized battery parts producing a high-nickel feedstock and cadmium-oxide, or melt the high-nickel feedstock in order to separate molten nickel metal and cadmium vapor producing remelt alloy and cadmium-metal and cadmium-oxide.

In Step 10a, when roasting shredded/sized battery parts in order to produce roasted high-nickel feedstock, cadmium-metal and cadmium-oxide, the furnace's induction capacity is preset to a 74% inductive coil rating. At this specified rating the shredded/sized battery parts will not melt (amalgamate) and release their cadmium component parts as cadmium vapor. At the completion of the roasting process, a 78% induction coil rating, the furnace is emptied of it content, roasted high-nickel feedstock (void of all cadmium content) into steel drums for high temperature storage. The Roasted High-Nickel Feedstock may reenter the process for alloying or be sold as remelt feedstock. Regarding the production of Remelt Alloy, once the furnace's crucible reaches a predetermined quantity or level or molten metal with the desired alloy specifications, the molten nickel alloy product is poured into a mold (Step 11). The mold is coated with graphite and reacts with the molten metal while filling. Once filled, the molten metal is blanketed with graphite and a slag-coagulant forming an oxygen depleted blanket over the metal protecting it from oxidation.

As cadmium vapor fills the crucible of the furnace and the molten metal level rises, it ($Cd_{(g)}$) is displaced and carried into the cadmium flash chamber (Step 12). The chamber is protected by an atmospheric blanket and maintains a temperature just below cadmium's boiling point. As Cd(g) enters, it cools and precipitates out into a condensation pan (Step 13) which is held at constant temperature in order to keep the cadmium in a liquid phase. As the level of Cd(l) rises in the pan, it drips out into a chilled bath of water forming Cd(s) pallets. Any cadmium vapor that fails to condense out in the flash chamber is captured in a fume ring (14) adjacent the crucible, and reclaimed as cadmium-oxide (CdO) in a bag-house (15) or other collector.

While the invention has been described with reference to preferred and example embodiments, it will be understood by those skilled in the art that a variety of modifications, additions and deletions are within the scope of the invention, as defined by the following claims.

What is claimed is:

1. A process for reclaiming nickel and cadmium from a feed source, the process comprising:
    shredding the feed source to produce feed particles;
    screening the feed particles to remove particles deviating from an optimum size of about 3/4";
    removing non-metallic materials from the feed particles; and
    induction heating the feed particles to generate a nickel product and a cadmium product.

2. The process of claim 1, wherein the feed source comprises nickel-cadmium batteries.

3. The process of claim 1, further comprising applying an atmospheric blanket over the particles during the induction heating step.

4. The process of claim 1, wherein the metallic and non-metallic materials are separated by vibration sorting.

5. The process of claim 1, wherein the non-metallic materials are removed from the feed particles by magnetic sorting.

6. The process of claim 5, wherein the magnetic sorting is carried out in a rotating drum sorter.

7. The process of claim 1, further comprising a second screening step after the separation step.

8. The process of claim 1, further comprising adding graphite to the feed particles prior to completion of the induction heating step.

9. The process of claim 1, wherein the nickel product is a high-nickel remelt feedstock, the process further comprising melting and casting the high-nickel remelt feedstock.

10. The process of claim 1, wherein the cadmium product is collected by a flash chamber into a condensation collector.

11. The process of claim 1, wherein the cadmium product is collected by capturing cadmium vapor in a fume ring.

12. The process of claim 1, wherein the cadmium product comprises cadmium oxide.

13. A process for reclaiming and separating nickel and cadmium products from a feed source, the process comprising:
    shredding a feed source comprising nickel-cadmium batteries to produce feed particles;
    screening the feed particles to produce a feed stream of substantially uniform particle size not deviating from an optimum size of about 3/4";
    removing non-metallic materials from the feed stream in a vibratory sorter;
    induction heating the feed stream;
    adding graphite to the feed stream prior to completion of the induction heating step;
    collecting a nickel product; and
    collecting a separate cadmium product.

14. The process of claim 13, further comprising melting and casting the nickel product.

15. The process of claim 13, wherein the cadmium product comprises cadmium oxide.

16. The process of claim 13, further comprising applying an atmospheric blanket during the induction heating step.

* * * * *